(12) United States Patent
Gory

(10) Patent No.: US 8,402,632 B2
(45) Date of Patent: Mar. 26, 2013

(54) METHOD FOR CRIMPING AN INSERT IN A SUPPORT WITH TWO SUPERPOSED PANELS

(75) Inventor: Philippe Gory, Saint Thibaud de Couz (FR)

(73) Assignee: Bollhoff Otalu S.A., La Ravoire (FR)

( * ) Notice: Subject to any disclaimer, the term of this patent is extended or adjusted under 35 U.S.C. 154(b) by 332 days.

(21) Appl. No.: 12/744,546

(22) PCT Filed: Dec. 2, 2008

(86) PCT No.: PCT/FR2008/001672
§ 371 (c)(1),
(2), (4) Date: May 25, 2010

(87) PCT Pub. No.: WO2009/101277
PCT Pub. Date: Aug. 20, 2009

(65) Prior Publication Data
US 2010/0251532 A1  Oct. 7, 2010

(30) Foreign Application Priority Data

Dec. 4, 2007 (FR) ...................................... 07 08448

(51) Int. Cl.
*B21J 15/04* (2006.01)
*F16B 19/10* (2006.01)
*F16B 37/06* (2006.01)

(52) U.S. Cl. ................ 29/525.06; 29/525.05; 29/525.13; 29/812.5; 29/243.522; 29/243.521

(58) Field of Classification Search ............... 29/525.06, 29/525.05, 525.13, 812.5, 243.522, 243.521; 72/466.4, 453.17, 453.19
See application file for complete search history.

(56) References Cited

U.S. PATENT DOCUMENTS 2,767,877 A * 10/1956 Newsom ....................... 403/167
(Continued)

FOREIGN PATENT DOCUMENTS

DE  44 17 279 A1   11/1995
FR  1 414 353 A   10/1965
(Continued)

OTHER PUBLICATIONS

International Search Report issued for International Application No. PCT/FR2008/001672 on Aug. 13, 2009 (with translation).

*Primary Examiner* — Derris Banks
*Assistant Examiner* — Kaying Kue
(74) *Attorney, Agent, or Firm* — Oliff & Berridge, PLC

(57) ABSTRACT

A method for crimping an insert to be clinched in a support by means of a placing apparatus having an anvil, in an area where the support comprises superposed first and second panels at a distance from one another, wherein the shank is inserted axially in the support and the anvil is brought up against the distal end of the shank, and the second section is then axially compressed against the anvil to create a securing edge, axial compression of the second section then being continued to create a crimping rim delineating an anchoring groove, in combination with the securing edge, surrounding the second panel, axial compression of the second section then being continued to bring about clamping of the support between the securing head and the securing edge in conjunction with clamping of the second panel between the securing edge and the crimping rim.

11 Claims, 5 Drawing Sheets

U.S. PATENT DOCUMENTS

| | | | |
|---|---|---|---|
| 3,365,998 A * | 1/1968 | Zahodiakin | 411/34 |
| 4,907,922 A * | 3/1990 | Jeal et al. | 411/43 |
| 5,263,247 A * | 11/1993 | Adachi et al. | 29/845 |
| 5,664,919 A * | 9/1997 | Smith | 411/34 |
| 7,010,845 B2 * | 3/2006 | Muller et al. | 29/512 |
| 7,464,452 B2 * | 12/2008 | Yamamoto et al. | 29/505 |
| 8,061,009 B2 * | 11/2011 | Gory et al. | 29/525.06 |

FOREIGN PATENT DOCUMENTS

GB     1 244 034 A     8/1971

\* cited by examiner

METHOD FOR CRIMPING AN INSERT IN A
SUPPORT WITH TWO SUPERPOSED PANELS

BACKGROUND OF THE INVENTION

The invention relates to a method for crimping an insert to be clinched in a support by means of a placing apparatus having an anvil, in an area where the support comprises superposed first and second panels at a distance from one another, respectively comprising first and second passage apertures, a method wherein the nut comprises a securing head and a shank or body subdivided into a first section arranged on the same side as the securing head and a second crimping section of reduced cross-section subdivided into a first segment, adjacent to the first section, delineating a first tapped bore having a first diameter and a second segment delineating a second tapped bore having a second diameter that is larger than the first diameter

STATE OF THE ART

An insert conventionally comprises a securing head and a shank that is often cylindrical. A problem arises when such an insert has to be fitted in a hole made in a support, even more so in an area where the support comprises two superposed panels at a distance from one another. Such a support can for example be formed by a sandwich structure composed of two sheets containing a material of lower density, or by two diametrically opposite walls of a tube. As each panel comprises a passage aperture, known crimping methods cause almost systematic damage to the panels and the result presents a low tensile adhesion strength. This problem is of particular importance when the insert is formed by a countersunk clinch nut.

A countersunk clinch nut is a nut designed to be secured by deformation on a support of small thickness. A countersunk clinch nut can be broken down into two distinct areas: the head and the shank The head, which can take different forms, comes into contact, via its bottom surface, with a support on which the nut is fitted. The shank is divided into two distinct sections: a tapped section and a crimping section. The tapped section, which is the functional part of the countersunk nut after the latter has been fitted on the support, is arranged on the opposite side from the head and has to present sufficient strength to be able to resist the axial forces applied to a standardized screw inserted in the countersunk nut without deforming The function of the crimping section, which is situated between the head and the tapped section, is to deform under the action of an axial tractive force applied on the bore of the tapped section. Such an axial force can be transmitted, at the time the nut is fitted in place, by a traction rod of a placing apparatus further comprising an anvil forming an axial stop The deformation creates a crimping rim that clamps the support against the bottom surface of the head thereby securing the latter on the support.

A first shortcoming arises from the fact that, after the crimping operation, the tapped section of the nut is completely outside the support, salient from the latter.

Furthermore, a problem arises when such a countersunk clinch nut has to be fitted on a support in an area where the support comprises two superposed panels at a distance from one another. When fitting is performed on such a support with superposed panels with interposition of a gap, formation of the crimping rim, which is difficult to control, is liable to cause damage to the support. Furthermore, as the loads applied on the nut are only taken up by the single panel in contact with the head, the tensile adhesion strength remains limited.

OBJECT OF THE INVENTION

The object of the invention consists in proposing a method for crimping a clinching insert that enables the tensile adhesion strength to be increased while at the same time reducing the risks of damaging the support.

The method according to the invention is remarkable in that it consists in:
  inserting the shank axially in the support, on the side where the first panel is situated, through first and second passage apertures, up to a position of the insert where the distal end of the shank opposite the head is flush with the second panel through the second aperture, and in bringing the anvil up against the distal end of the shank,
  compressing the second section axially against the anvil to fold the second segment over onto the second panel and create a pressing edge radially salient from the shank,
  continuing axial compression of the second section to create a crimping rim axially interposed between the first section and the second panel and, in combination with the pressing edge, delineating an anchoring groove surrounding the second panel at the periphery of the second aperture,
  continuing axial compression of the second section to bring the securing head into contact against the first panel and create clamping of the support between the securing head and the pressing edge, in conjunction with clamping of the second panel between the pressing edge and the crimping rim.

After crimping, the first section is housed in the thickness of the support so that the insert is integrally sunk in the support. Thus, if the first section internally delineates a bore so that the insert forms a countersunk clinch nut, the whole of the countersunk clinch nut is completely sunk in the support after crimping, even the tapped section.

According to another advantage, the shoulder formed by the junction between the first and second tapped bores determines the axial position of the anchoring groove. Cooperation between the second panel and the shank of the insert takes place by clamping the second panel (at the periphery of the second aperture) between the sides of the anchoring groove (formed on one side by the crimping rim and on the other side by the pressing edge), and no longer by a unidirectional axial compression as in the prior art. Combining these two features results in a reduction of the risks of damage when crimping in the support.

According to a third advantage, the crimping rim performs the same function of axial securing with respect to the second panel as that performed by the securing head with respect to the first panel. The axial loads applied on the insert are distributed over the two panels, in particular if the screw is assembled in the opposite direction to the securing head in the case where the insert is a nut This results in a large increase of the tensile adhesion strength with respect to the support wherein the nut is sunk on completion of the crimping method according to the invention.

According to a preferred embodiment wherein the first section internally delineates a bore and the placing apparatus comprises a threaded traction rod extending the anvil, the first step is achieved by the following successive phases:
  the shank is inserted axially in the support, on the same side as the first panel, via at least a first passage aperture, on the side where the second panel is situated, the traction rod is inserted axially in the shank to engage the thread of the rod in the bore of the first section, the traction rod is tightened until the anvil is made to come into contact against the second panel, and the distal end of the shank comes into contact against the anvil.

An alternative embodiment of the method comprises an additional step wherein axial compression of the second section is continued to bring the securing head and pressing edge towards one another and create a first and second depression respectively in the first and second panels resulting from local deformation of the first and second panels at the periphery of the first and second passage apertures.

In the additional step, it can be provided for the movement of the securing head and pressing edge towards one another to be controlled so that the securing head is flush with the first panel at the periphery of the first depression, and/or that the pressing edge is flush with the second panel at the periphery of the second depression.

BRIEF DESCRIPTION OF THE DRAWINGS

Other advantages and features will become more clearly apparent from the following description of particular embodiments of the invention given for non-restrictive example purposes only and represented in the accompanying drawings, in which.

DESCRIPTION OF PREFERRED
EMBODIMENTS OF THE INVENTION

Figure 1:
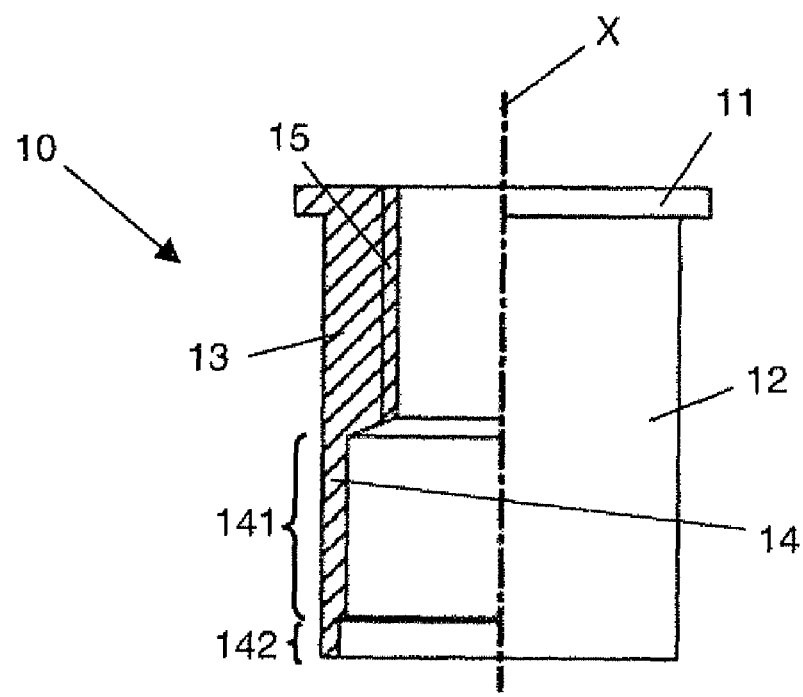
FIG. 1 represents an example of a countersunk clinch nut according to a first aspect of the invention.

FIG. 1 illustrates a countersunk clinch nut 10 that can be used in the crimping method corresponding to the invention and described in the following.

With reference to FIG. 1, a countersunk clinch nut 10 comprises a securing head 11 and a shank 12. Head 11 is in the form of an annular collar. Shank 12 has a cylindrical external shape and in this respect comprises an axis of revolution X. In the following, the terms "axially" and "axial" shall be construed as referring to the axis X. The annular collar forms a shoulder with the external surface of shank 12. The shoulder constitutes the active part of securing head 11 having the function of participating in clamping the support during crimping of nut 10 and subsequently of securing nut 10. Securing head 11 can however be of any shape provided that these two functions are fulfilled.

Shank 12 is axially subdivided into a first tapped section 13 receiving threaded traction rod 21 of a placing apparatus (see FIGS. 3 to 7) and a second crimping section 14 of reduced cross-section. The thickness of the wall constituting crimping section 14 is smaller than that of tapped section 13 so as to enable deformation of the material constituting the wall of crimping section 14 by application of an axial compression force on crimping section 14. First tapped section 13, internally delineating a bore 15, is arranged on the same side as securing head 11. Bore 15 constitutes the active part of nut 10 after crimping having the role of withstanding, without deforming, the axial forces applied to a standardized screw (not shown) inserted into countersunk nut 10 by screwing into bore 15.

Second crimping section 14 is subdivided into a first segment 141, adjacent to first section 13, delineating a first bore having a first diameter and a second segment 142 delineating a second bore having a second diameter that is larger than the first diameter. In the alternative embodiment illustrated, the height of second segment 142, counted along the axis X, is much smaller than that of first segment 141, for example about six times smaller.

Figure 2:
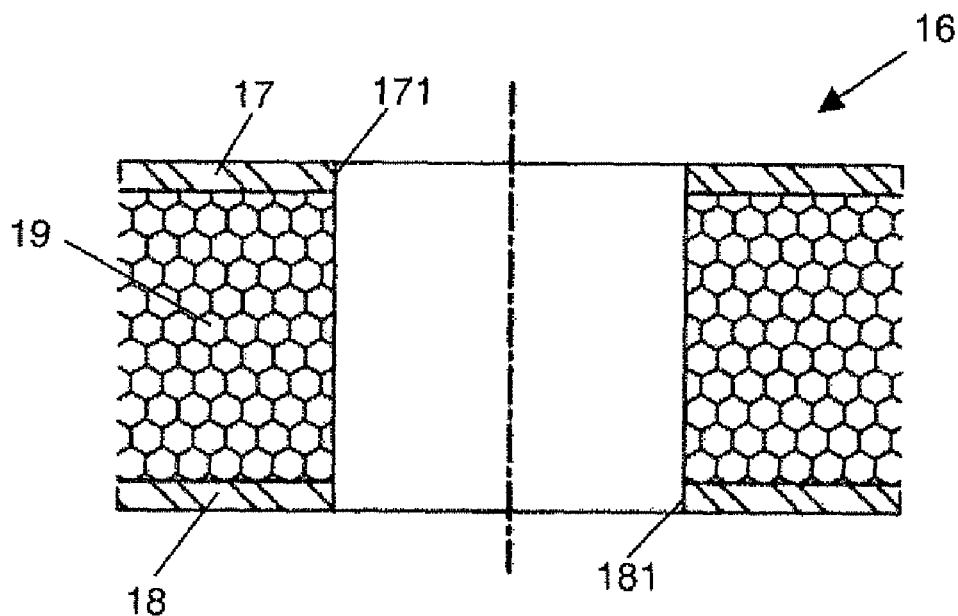
FIG. 2 represents an example of a support used in an example of a crimping method according to another aspect of the invention.
Figure 3:
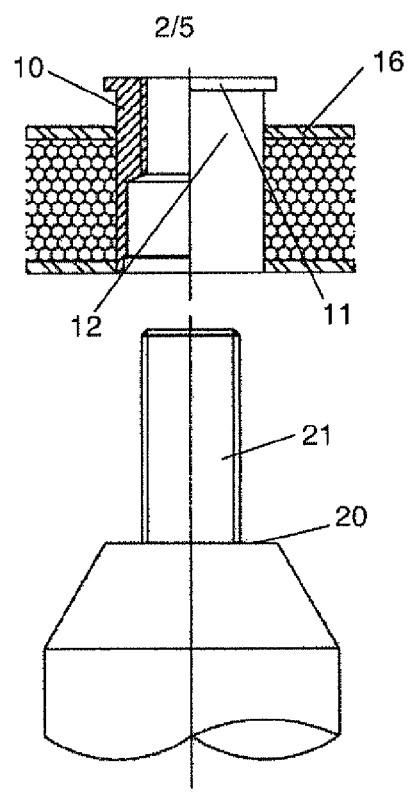
FIGS. 3 to 7 illustrate the different steps of the example of the crimping method.

With reference to FIG. 3 and the following, the crimping method according to the invention is designed to fit an insert to be clinched in a support 16, in an area where support 16 comprises superposed first and second panels 17, 18 at a distance from one another. An example of such a support 16 is illustrated in FIG. 2 in which panels 17, 18 form the two sheets of a sandwich structure containing a material 19 of lower density in the volume delineated between the two panels 17, 18. For example purposes, each panel 17, 18 is formed by a sheet of aluminium and material 19 of lower density is formed by a convoluted aluminium foam. In the example represented and in non-restrictive manner, the insert is formed by a countersunk clinch nut of the type represented in FIG. 1.

In the crimping method, panels 17, 18 respectively comprise first and second passage apertures 171, 181 for shank 12 of the insert. It is obvious that for shank 12 to pass through the whole thickness of support 16, material 19 comprises a cylindrical hole connecting passage apertures 171, 181. The example of crimping method illustrated in FIGS. 3 to 7 is performed using a placing apparatus comprising an anvil 20 extended by a threaded traction rod 21. Threaded traction rod 21 therefore comprises an external thread having a pitch and a nominal diameter corresponding to those of tapped bore 15.

Figure 4:
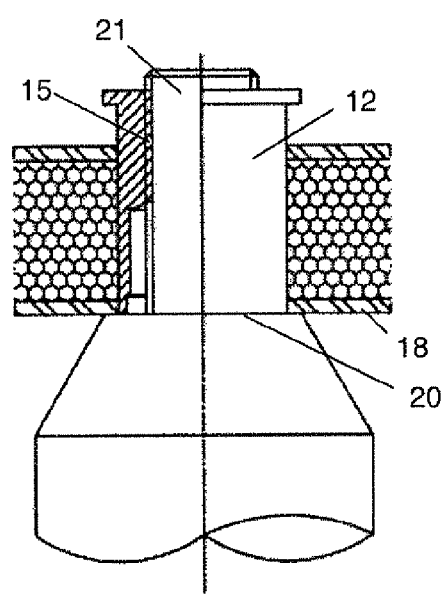

The illustrated example of the crimping method consists, in a first stage, in inserting shank 12 axially in support 16, on the same side as first panel 17, through at least first passage aperture 171, in then inserting threaded traction rod 21 axially in shank 12 on the same side as second panel 18 to engage the thread of rod 21 in tapped bore 15 of first section 13, and in then tightening traction rod 21 until anvil 20 is brought into contact against second panel 18 and the distal end of shank 12 is brought into contact against anvil 20 (see FIGS. 3 and 4). The distal end of shank 12 corresponds to the end of shank 12 opposite securing head 11. Performing the three successive phases above in practice enables the first step of the method according to the invention, defined here-below, to be achieved:

shank 12 is inserted axially in support 16, on the same side as first panel 17, through first and second passage apertures 171, 181, up to a position of insert 10 where the distal end of shank 12 opposite head 11 is flush with second panel 18 through second aperture 181, and anvil 20 is brought up against the distal end of shank 12.

Figure 5:
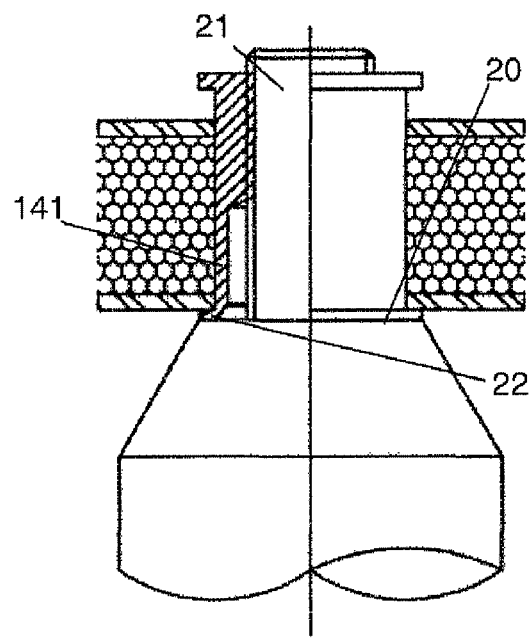
Figure 6:
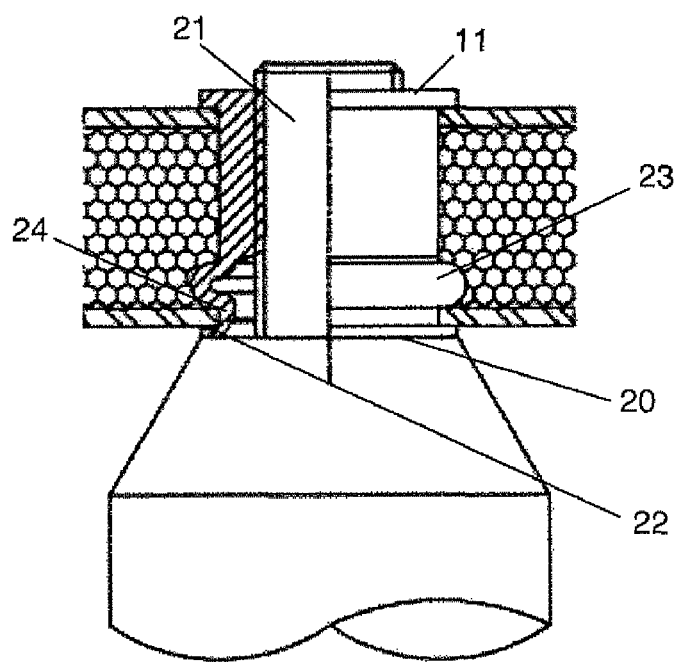

In the subsequent steps of the crimping method and with reference to FIGS. 5 and 6, the placing apparatus applies a traction movement to rod 21 so as to axially compress second section 14 against anvil 20. These compression forces force the material forming second section 14 to deform. At the beginning of compression, only the material at the level of second segment 142 deforms against anvil 20 to fold second segment 142 onto second panel 18 and create a securing edge 22 radially salient from shank 12 (FIG. 5).

In a step following formation of edge 22 and with reference to FIG. 6, the placing apparatus continues to apply compression forces to second crimping section 14 by traction of rod 21. Rod 21 continues axial compression of second section 14 to create a crimping rim 23 obtained by deformation of first segment 141. Crimping rim 23 is axially interposed between first section 13 and second panel 18. In combination with securing edge 22, it delineates an anchoring groove 24 which surrounds second panel 18 at the periphery of second aperture 181. During this step, the securing performed by securing edge 22 against second panel 18 has the effect of directing the deformation of first segment 141 centrifugally to the outside of shank 12 to guarantee formation of crimping rim 23 on the outside. Anchoring groove 24 is open on the outside of shank 12.

In a last step after formation of rim 23 and still with reference to FIG. 6, the placing apparatus continues to apply compression forces to second crimping section 14 by traction of rod 21. Rod 21 continues axial compression of second section 14 to bring securing head 11 into contact against first panel 17 and create crimping of support 16 between securing head 11 and securing edge 22, in conjunction with crimping of second panel 18 between securing edge 22 and crimping rim 23.

After crimping, first tapped section 13 is housed in the thickness of support 16 so that nut 10 is completely sunk in support 16. Furthermore, crimping rim 23 performs the same axial securing function with respect to second panel 18 as that performed by securing head 11 with respect to first panel 17. The axial loads subsequently applied on nut 10 are distributed over the two panels 17, 18, in particular if the standardized screw (not shown) is assembled in the opposite direction to securing head 11. This results in a considerable increase of the tensile adhesion strength of nut 10 with respect to support 16 wherein the latter is sunk on completion of the above crimping method.

Figure 7:
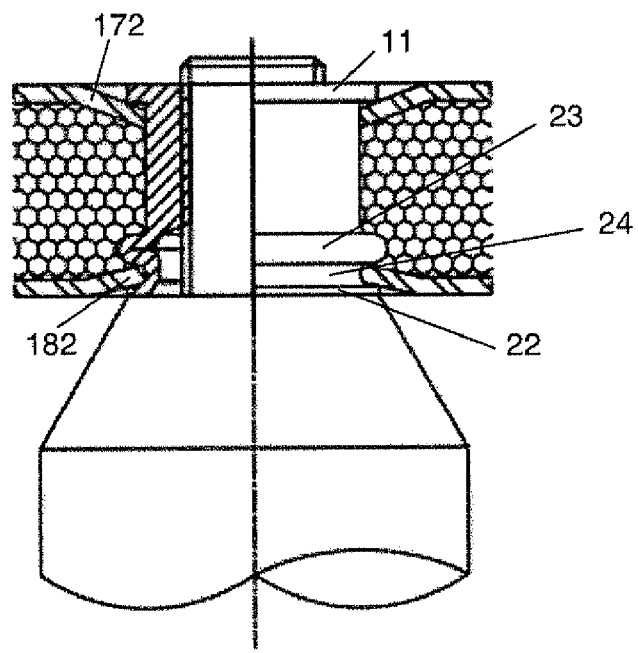

In an optional additional step and with reference to FIG. 7, it can be provided for rod 21 to continue axial compression of second section 14 to move securing head 11 and securing edge 22 axially towards one another. This moving together then results in creation of a first and second depression 172, 182 respectively in first and second panels 17, 18. Depressions 172, 182 are the consequence of a local deformation of first and second panels 17, 18 at the periphery of first and second passage apertures 171, 181.

In an advantageous alternative embodiment of the additional step, moving securing head 11 and securing edge 22 towards one another is controlled so that securing head 11 is flush with first panel 17 at the periphery of first depression 172. It can also be provided, in the additional step, for moving of securing head 11 and securing edge 22 towards one another to be controlled so that securing edge 22 is flush with second panel 18 at the periphery of second depression 182.

In a manner that is not represented, the crimping method according to the invention can be performed without such a placing apparatus. Axial compression can in fact be achieved by means of a press. In this case, anvil 20 can for example be formed by the fixed part of the press whereas the movable part thereof comes and presses against securing head 11 opposite the shoulder formed between head 11 and shank 12.

Figure 8:
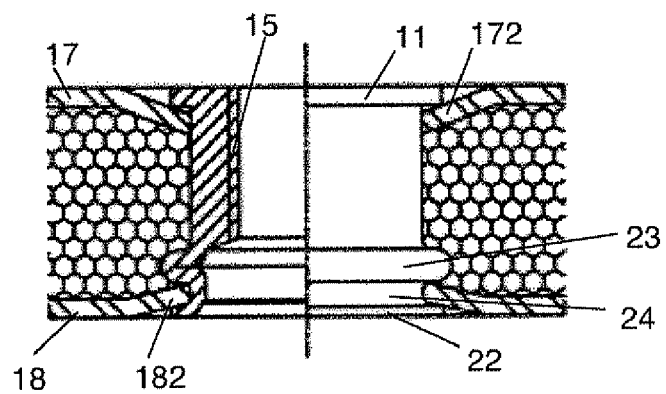
FIG. 8 represents the support and nut after the crimping process and after the placing apparatus has been removed.

In the case where axial compression of second section 14 is achieved by pulling exerted by threaded rod 21 (the placing apparatus therefore comprising a threaded traction rod 21), the placing apparatus has to be removed, after completion of the crimping method according to the invention, by unscrewing threaded rod 21 from tapped bore 15 to reach the situation of FIG. 8 where nut 10 is ready for use. This necessity of unscrewing arises whatever the alternative embodiment of the method, in particular whether the optional additional step has been performed or not. FIG. 8 illustrates that nut 10 is clinched in support 16 in a configuration where it is completely sunk in the thickness of support 16.

The shoulder formed by the junction between the first and second bores of first and second segments 141, 142 has the effect of directing the material constituting second segment 142 radially towards the outside of shank 12 during its deformation. This results in it being guaranteed that securing edge 22 is formed radially salient from shank 12. When continued axial compression of second section 14 is performed, such a securing edge 22 has the effect of preventing the material constituting first segment 141 from deforming concentrically in the direction of axis of revolution X of shank 12. On the contrary, the securing performed by edge 22 pressing against second panel 18 has the effect of directing deformation of first segment 141 centrifugally to the outside of shank 12 so as to guarantee formation of crimping rim 23. If such a shoulder did not exist, no securing edge 22 would be formed and crimping rim 23 would be formed at the outside of support 16, under second panel 18.

It is apparent from the foregoing that the crimping method described above can be adapted to any type of support 16, provided that the latter comprises two superposed panels 17, 18 at a distance from one another.

Figure 9:
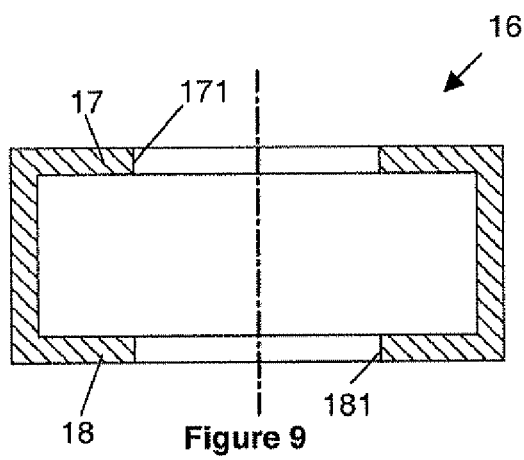
FIG. 9 represents another example of a support used in the example of the crimping method.
Figure 10:
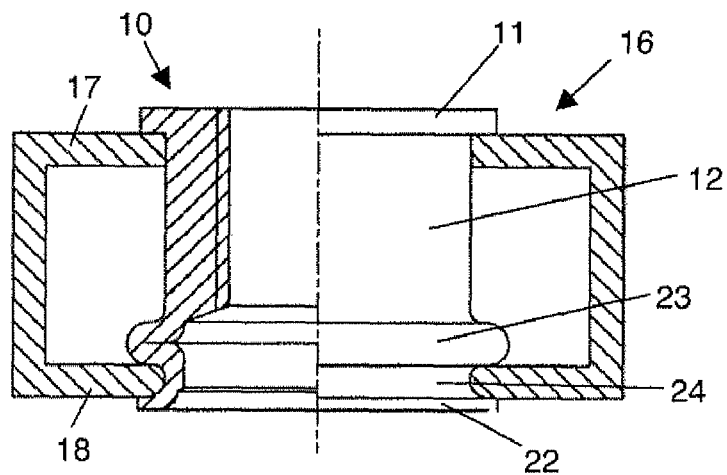
FIG. 10 illustrates the support of FIG. 9 and the nut after the crimping process and after the placing apparatus has been removed.

In particular, FIGS. 9 and 10 illustrate that the example of crimping method according to the invention can be performed with a different support 16: superposed panels 17, 18 at a distance from one another are formed by two diametrically opposite walls of a tube. Support 16 is therefore formed by the tube. Anchoring groove 24 creates (FIG. 10) clamping of one of the walls of the tube, whereas head 11 and edge 22 create clamping of the two walls of the tube.

Whatever the support 16, it can be provided for depressions 172, 182 to be preformed in panels 17, 18 (by any known means that is suited to the material of panels 17, 18) before implementation of the crimping process of nut 10 is begun. This alternative embodiment is used when it is desired that the additional step no longer be required, although depressions 172, 182 are necessary to sink edge 22 and/or head 11. This alternative embodiment also presents the advantage of avoiding any risk of damaging one of panels 17, 18 at the end of the method, as creation of depressions 172, 182 by nut 10 itself remains random.

Figure 11:
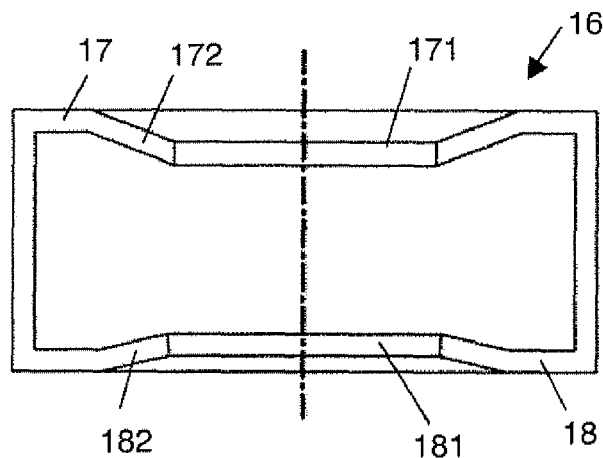
FIG. 11 represents another example of a support used in the example of the crimping method.
Figure 12:
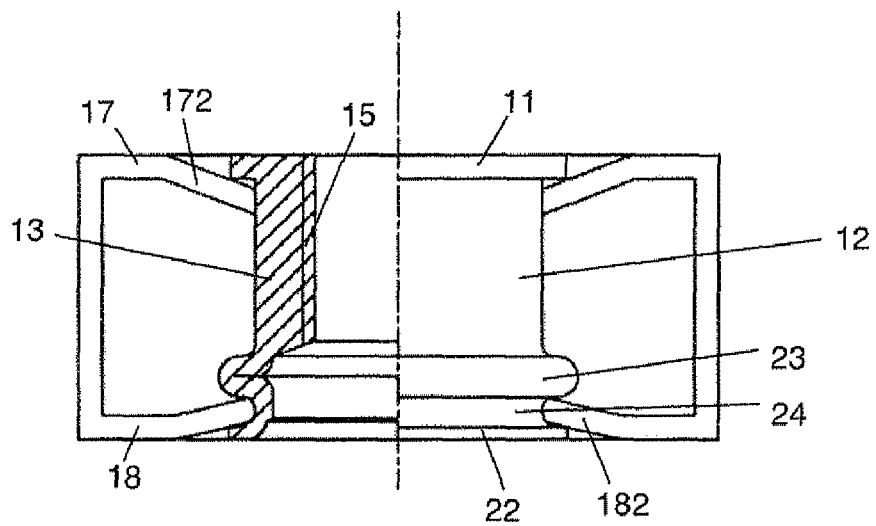
FIG. 12 illustrates the support of FIG. 11 and the nut after the crimping process and after the placing apparatus has been removed.

FIGS. 11 and 12 illustrate an identical tube that of FIGS. 9 and 10 but comprising depressions 172, 182 preformed in panels 17, 18 before the crimping method is implemented, respectively before fitting of nut 10 and after implementation of the crimping method.

The crimping method according to the invention has just been described in application to an insert formed by countersunk clinch nut 10 of FIG. 1. However, it can be applied to any other insert provided with a securing head and a shank comprising a first section (not compulsorily tapped) arranged on the same side as the head and a second crimping section of reduced thickness subdivided into a first segment, adjacent to the first section, delineating a first tapped bore having a first diameter and a second segment delineating a second tapped bore having a second diameter that is larger than the first diameter. Such an insert can for example be formed by a spacer or by a compression limiter.

The invention claimed is:

1. Method for crimping an insert to be clinched in a support by means of a placing apparatus having an anvil, in an area where the support comprises superposed first and second panels at a distance from one another, respectively comprising first and second passage apertures, wherein the insert comprises a securing head and a shank subdivided into a first section arranged on the same side as the securing head and a second crimping section of reduced cross-section subdivided into a first segment, adjacent to the first section, delineating a first bore having a first diameter and a second segment delineating a second bore having a second diameter that is larger than the first diameter, the method comprising:
   inserting the shank axially in the support, on the side where the first panel is situated, through the first and second passage apertures, up to a position of the insert where the distal end of the shank opposite the head is flush with the second panel through the second aperture, and then bringing the anvil up against the distal end of the shank,
   compressing the second section axially against the anvil to fold the second segment over onto the second panel and create a pressing edge radially salient from the shank,
   continuing axial compression of the second section to create a crimping rim axially interposed between the first section and the second panel and, in combination with the pressing edge, delineating an anchoring groove surrounding the second panel at the periphery of the second aperture,
   continuing axial compression of the second section to bring the securing head into contact against the first panel and create clamping of the support between the securing head and the pressing edge, in conjunction with clamping of the second panel between the pressing edge and the crimping rim.

2. Method according to claim 1, comprising an additional step that consists in continuing axial compression of the second section to bring the securing head and the pressing edge towards one another and to create first and second depressions respectively in the first and second panels, resulting from local deformation of the first and second panels at the periphery of the first and second passage apertures.

3. Method according to claim 2, wherein in the additional step, moving the securing head and the pressing edge towards one another is controlled so that the securing head is flush with the first panel at the periphery of the first depression.

4. Method according to claim 2, wherein in the additional step, moving the securing head and the pressing edge towards one another is controlled so that the securing edge is flush with the second panel at the periphery of the second depression.

5. Method according to claim 1, wherein the first section internally delineates a tapped bore.

6. Method according to claim 5, wherein the placing apparatus comprises a threaded traction rod extending the anvil, the first step consists in performing the following successive phases:
   inserting the shank axially in the support on the same side as the first panel, via at least the first passage aperture,
   inserting the traction rod axially in the shank, on the side where the second panel is located, to engage the thread of the rod in the tapped bore of the first section,
   tightening the traction rod until the anvil is brought into contact with the second panel and the distal end of the shank comes into contact against the anvil.

7. Method according to claim 3, wherein in the additional step, moving the securing head and the pressing edge towards one another is controlled so that the pressing edge is flush with the second panel at the periphery of the second depression.

8. Method according to claim 2, wherein the first section internally delineates a tapped bore.

9. Method according to claim 3, wherein the first section internally delineates a tapped bore.

10. Method according to claim 4, wherein the first section internally delineates a tapped bore.

11. Method according to claim 7, wherein the first section internally delineates a tapped bore.

* * * * *